US005241512A

United States Patent [19]

Argy et al.

[11] Patent Number: 5,241,512

[45] Date of Patent: Aug. 31, 1993

[54] ACOUSTIC PROTECTION MATERIAL AND APPARATUS INCLUDING SUCH MATERIAL

[75] Inventors: Gilles Argy, La-Queue-Les-Yvelines; Gustavo Alcuri, Paris, both of France

[73] Assignee: Hutchinson 2, Paris, France

[21] Appl. No.: 873,369

[22] Filed: Apr. 24, 1992

Related U.S. Application Data

[63] Continuation of Ser. No. 862,303, Apr. 2, 1992.

[30] Foreign Application Priority Data

Apr. 25, 1991 [FR] France ................................ 91 05104

[51] Int. Cl.[5] .......................... F16F 7/00; F16F 15/00

[52] U.S. Cl. ........................................ 367/1; 181/207; 181/284; 181/286; 181/198

[58] Field of Search ........................... 367/1, 162, 176; 181/207, 208, 209, 284, 286, 294, 198

[56] References Cited

U.S. PATENT DOCUMENTS

| | | | |
|---|---|---|---|
| 3,887,031 | 6/1975 | Wirt | 181/209 |
| 4,116,303 | 9/1978 | Trudel | 181/252 |
| 4,228.869 | 10/1980 | Bschorr | 181/286 |
| 4,273,213 | 6/1981 | Munz | 181/207 |
| 4,300,978 | 11/1981 | Whitemore et al. | 181/288 |
| 4,373,608 | 2/1983 | Holmes | 181/202 |
| 4,924,976 | 5/1990 | Bernett et al. | 188/378 |

FOREIGN PATENT DOCUMENTS

| | | |
|---|---|---|
| 0064677 | 11/1982 | European Pat. Off. . |
| 086184 | 8/1983 | European Pat. Off. . |
| 0316744 | 5/1989 | European Pat. Off. . |
| 2834823 | 8/1978 | Fed. Rep. of Germany . |
| 8903942 | 3/1989 | Fed. Rep. of Germany . |
| 20027255 | 2/1980 | United Kingdom . |

OTHER PUBLICATIONS

Soviet Physics Acoustics, vol. 28, No. 4., 286-287, E. K. Grishchenko, et al.

*Primary Examiner*—J. Woodrow Eldred

*Attorney, Agent, or Firm*—Flehr, Hohbach, Test, Albritton & Herbert

[57] ABSTRACT

Material for providing acoustic protection against a source of noise, the material comprising a substrate and resonators, wherein said resonators formed on the substrate are constituted by thread-like and/or area-occupying composite elements whose structural characteristics (density, modulus of elasticity, shear modulus, damping factor, piezoelectric factor, etc. ...) and whose shape and/or size are selected to associate a predetermined resonant frequency with each resonator, and also to absorb the sound pressure energy from the noise source at said resonant frequency and dissipate it in the form of mechanical heat energy and/or electrical energy. The invention also relates to apparatus constituted by a wall including at least one layer of the above material.

20 Claims, 6 Drawing Sheets

FIG. 4
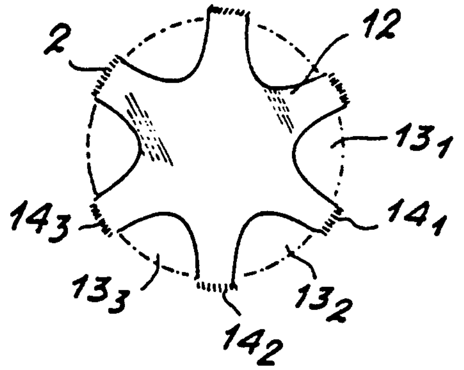
FIG. 5
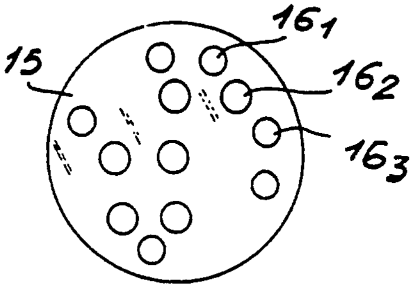
FIG. 6 A
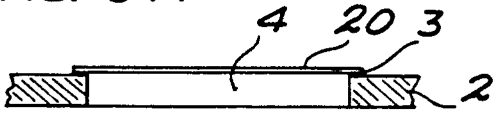
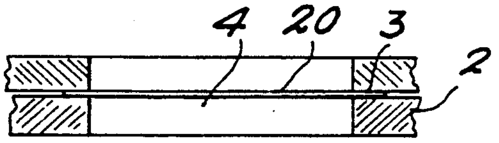
FIG. 6 B
FIG. 7 A
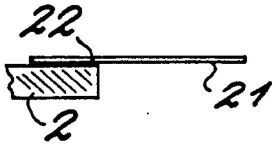
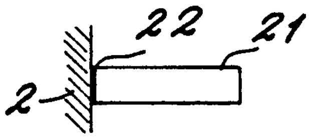
FIG. 7 B
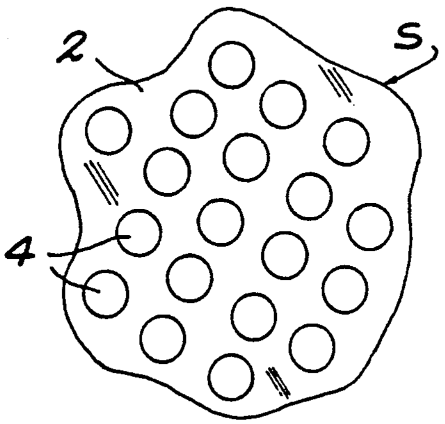
FIG. 8

ACOUSTIC PROTECTION MATERIAL AND APPARATUS INCLUDING SUCH MATERIAL

This is a continuing application of U.S. application Ser. No. 07/862,303, filed Apr. 2, 1992, pending.

The invention relates to acoustic protection material and to apparatus including such material.

BACKGROUND OF THE INVENTION

The importance attached to reducing sound nuisance is well known both in the home and in industry, and although various means for combatting noise have been developed, the results obtained are not always satisfactory or they can be made satisfactory only at the cost of great difficulty. Thus, besides an initial approach which consists in limiting as much as possible the sound level emitted by a source such as an engine, a high speed flow of fluid, etc., proposals have been made to interpose protective walls between the source of sound and a region in which it is desired to reduce sound pressure, with the effectiveness of the protective walls increasing with increasing density of the material from which they are made. Nevertheless, good results can be obtained, e.g. in the building industry, only by using wall thicknesses that are technically and/or economically difficult to implement. Another approach then consists in performing acoustic correction by means of absorbent materials placed on a partition delimiting an enclosure to be protected so as to reduce as much as possible the reverberation of soundwaves on said partition. The sound pressure level reductions obtained in this way are of the order of 4 dB to 6 dB, and that does not make it possible to obtain an effect which is sufficient for significantly protecting enclosures exposed to sources of intense sound.

Using a different method, known as "active absorption", proposals have also been made to detect and analyze the soundwave emitted by a source of noise, and to cause said wave to disappear completely or partially by means of loudspeakers or analogous means disposed in the region to be protected and generating a soundwave in phase opposition with the incident source wave. Such a method is both complex and expensive, and consequently use thereof is limited to very specific cases where the regions to be protected are small in size and where the sound frequency ranges are not too large. That is why use is sometimes made of walls including air resonators of the Helmholtz resonator type as described for instance in British Patent Specification GB-A-2 027 255, or composite walls made up of volume-occupying elements secured to a support and that enter into resonance at predetermined frequencies as described, for instance, in German Patent Specification DE A-2 834 823. In order to work in the low frequency range (100 Hz to 300 Hz) walls of the first type (including Helmholtz resonators) require relatively large resonator volumes, while nevertheless limiting the acoustic corrections obtained in this range to the (necessarily small) ratio of the sum of the areas of the throats of the resonators disposed in the wall to the total area of said wall. Although the use of composite walls having volume-occupying elements turns out to be effective when the materials associated with the wall have large viscous friction (such as elastomers), this technique is nevertheless difficult to implement when a high degree of acoustic protection is sought over a wide range of sound frequencies.

The problem thus arises in the fields of acoustic protection, correction, and conditioning, of supplying a material and apparatus firstly enabling the drawbacks of known techniques to be mitigated, secondly being easy to implement and providing results that are satisfactory including over a wide audible frequency range, and finally having a cost that is economically acceptable.

A general object of the invention is to provide a material and apparatus incorporating such a material that enable this problem to be solved.

Another object of the invention is to provide a material and apparatus incorporating such a material which obtain very effective protection while using thin plates that are easy to make, that are suitable for being easily assembled, and for being cleaned, and in general, that are easily used by a nonspecialized user using means and tools that are simple and commonly available.

SUMMARY OF THE INVENTION

The present invention provides a material for providing acoustic protection against a source of noise, the material comprising a substrate and resonators, wherein said resonators formed on the substrate are constituted by thread-like and/or surface extending elements whose structural characteristics (density, modulus of elasticity, shear modulus, damping factor, piezoelectric factor, etc.) and whose shape and/or size are selected to associate a predetermined resonant frequency with each resonator, and also to absorb the sound pressure energy from the noise source at said resonant frequency and dissipate it in the form of mechanical heat energy and/or electrical energy.

The substrate may be pierced by orifices in which, or at the edges of which said elements constituting the resonators are secured, said elements being in the form of vibrating membranes and/or vibrating strings, and/or vibrating blades.

In a first preferred embodiment, each resonator is made of a sheet of material having a high modulus of elasticity, and a low damping factor, for instance a metal or metal alloy sheet, such as aluminum.

In a modification, each resonator is a composite membrane comprising at least two sheets of material having a high modulus of elasticity, and a low damping factor (tan $\delta$), and a sheet of material having a low shear modulus and a high damping factor (tan $\delta$).

In one implementation, the composite membrane is of the sandwich type with outer sheets of metal or metal alloy, such as aluminum, of a thickness lying in the range 10 microns to 200 microns enclosing between them a sheet of elastomer material selected to have a damping factor (tan $\delta$) lying in the range $10^{-2}$ to $50.10^{-2}$ and a thickness lying in the range 20 microns to 500 microns.

In a modification, the composite membrane is of the sandwich type with outer sheets made of said elastomer material and a core constituted by a sheet of metal or metal alloy, such as aluminum, the thicknesses and the damping factors being the same as those specified for the sandwich structure as defined immediately above.

The membrane whether composite or made of metal may have a circular outline, but it may also have an outline that is square, rectangular, elliptical, crescent-shaped, etc., or that has lobes.

If it has lobes, the invention provides for taking advantage of the number of lobes used for securing the membrane peripherally to the substrate to establish the value of the predetermined resonant frequency.

This frequency may also be fixed or adjusted by forming one or more arrays of corrugations on the membrane, thereby reducing the bending stiffness of the membrane and thus lowering its resonant frequency.

The resonant frequency may also be fixed to a predetermined value (e.g. by calculation using the method of finite elements) by making openings of various shapes and/or dispositions in the surface of the membrane.

In another embodiment, each resonator secured in or at the edges of orifices in the substrate is constituted by a thread-like element obtained by twisting together fibers having a high modulus of elasticity.

In a modification of the last mentioned embodiment, each resonator is a composite element contained by twisting together fibers having a high modulus of elasticity and then embedding said twist within an appropriate quantity of a material having good damping characteristics.

In yet another embodiment, the resonators associated with the orifices of the substrate are vibrating blades each secured at one end, and constituted by a metal and/or polymer material having a high modulus of elasticity.

In a modification of said embodiment, the resonators are composite blades made of metal associated with a material having a high damping factor.

Whatever the embodiment (membrane, string, or vibrating blade), the invention provides for the substrate being made of a flexible material such as an elastomeric or plastomeric type material.

Although the above-defined embodiments and implementations of the acoustic protection material of the invention dissipate sound pressure energy directly in the form of heat, the invention also provides for other embodiments in which the acoustic protection material transforms the sound pressure energy into electrical energy, which electrical energy is then dissipated in the form of heat by means of the Joule effect.

Under such circumstances, the substrate is associated firstly with sheets of a crystalline or poly-crystalline type material having piezoelectric properties such that electric charges appear on the surfaces of said sheets in response to a sound pressure wave, and secondly with very thin conductive electrodes collecting the electric charges generated to cause them to pass through electrical resistances or through materials having analogous properties.

In one implementation, the sheets generating electric charges in response to a sound pressure wave are constituted by films of PVDF type polymer made semi-crystalline by an appropriate thermomechanical treatment, the electric charge collecting electrodes being constituted by fine metal films obtained by vacuum metallization on the polymer sheets, or in a variant by very thin sheets of metal or metal alloy, e.g. based on aluminum, that are glued on said polymer film by means of an intrinsically conductive adhesive.

The invention also provides acoustic conditioning and/or protection apparatus constituted by a wall including at least one layer of material as defined above.

In a preferred embodiment of such an apparatus, the wall includes a plurality of layers of said material, said layers being disposed in such a manner that the resonators of adjacent layers do not face one another.

In addition, the invention provides for the layers of the apparatus to be made of acoustic protection materials that differ from one another in the resonators that they implement, not only with respect to the shape, the disposition, and/or the nature of the elements of said resonators, but also, where appropriate, with respect to the substrates on which said resonators are disposed.

When the absorbed sound pressure energy is transformed into electrical energy, apparatus of the invention comprises a multiplicity of layers of material as defined above, with the electrodes of each layer being put into electrical continuity via microperforations through the sheets generating the electric charges in said layers.

BRIEF DESCRIPTION OF THE DRAWINGS

Embodiments of the invention are described by way of example with reference to the accompanying drawings, in which:

FIGS. 4 and 5, are plan views showing the shapes of membranes used in making up a material of the invention;

FIGS. 6A and 6B are respectively a section view and a plan view of another resonator suitable for use in making up a material of the invention;

FIGS. 7A and 7B are views analogous to those of FIGS. 6A and 6B, but for another embodiment;

FIG. 8 is a plan view of a layer of material of the invention;

DETAILED DESCRIPTION

Figure 1A:
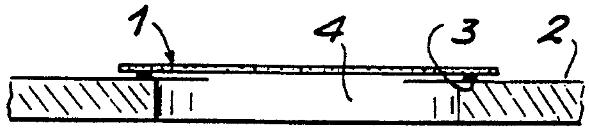
FIGS. 1A and 1B are a section view and a plan view respectively of a membrane resonator.
Figure 1B:
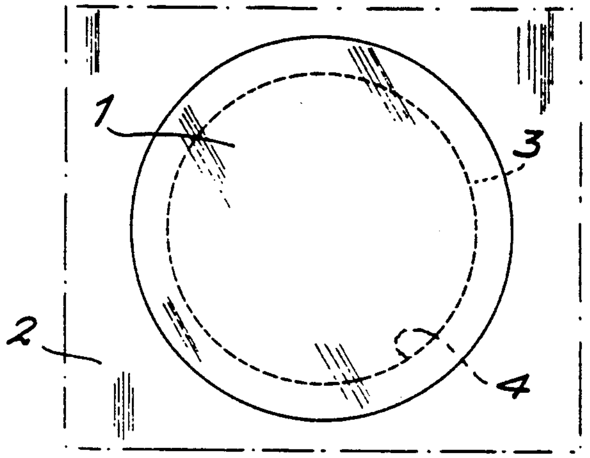

Reference is made initially to FIGS. 1A and 1B which show an example of a vibrating membrane 1 of circular outline secured via its edge 3 on a substrate 2 that has a circular hole 4. When such a membrane 1 is subjected to a pressure P that varies substantially sinusoidally with time and that has a wide frequency range, said membrane enters into resonance at a frequency $f_0$ such that:

$$\text{(I) } f_0 = f[R^{-2}, E^{\frac{1}{2}}, e, \rho^{-\frac{1}{2}}]$$

where:

R designates the radius of the membrane;

E is the modulus of elasticity of the material from which the membrane is made;

e is the thickness of the membrane; and $\rho$ is the density of the material constituting the membrane.

If the shear modulus of said membrane is designated G and if its damping factor is designated by tan $\delta$, and given that the membrane is subjected to the same number of alterations per unit time as the exciting sound wave of frequency $f_0$ the energy absorbed per alternation is given by a formula of the type:

(II) $W_{Joule}=f[R^6, e^{-3}, P^2, G^{-1}, (\tan \delta)^{-1}]$ where R and e have the same meanings as above, and where P designates the pressure of the soundwave.

It thus appears from equations (I) and (II) that the resonant frequency $f_0$ of the membrane is a function of the modulus of the elasticity and of the shear modulus of the material from which it is made, and that for a given resonant frequency and for a given membrane radius, there exists a correlation domain between the modulus of elasticity, the shear modulus, and the damping factor enabling a preferred value of energy to be absorbed per alternation.

In accordance with the invention, and in a preferred embodiment, said value is obtained by using a membrane 1 which is made of metal, such as aluminum or is made of metallic alloy or else is a composite metallic plate.

Figure 2A:
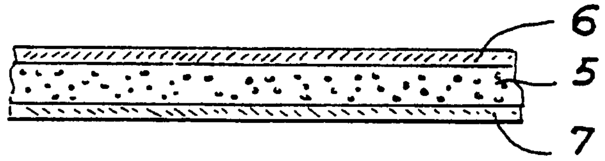
FIGS. 2A and 2B are highly diagrammatic section views of composite membranes suitable for use in making up a material of the invention.

In a modification, membrane 1 is made as a sandwich-type composite membrane, see FIG. 2A, comprising a core 5 made of a material having a low shear modulus ($G_2$), a thickness $e_2$, and a high damping factor ($\tan \delta_2$), disposed between sheets 6 and 7 respectively of thicknesses $e_1$ and $e_2$, each being made of a material having a high modulus of elasticity ($E_1$ and $E_3$, respectively), and a low damping factor ($\tan \delta_1$ and $\tan \delta_3$, respectively).

Figure 2B:
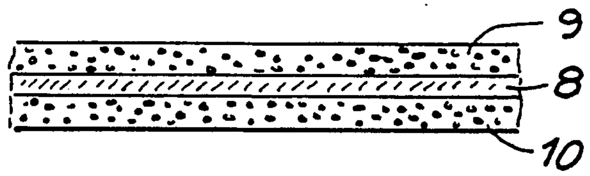

In another embodiment, see FIG. 2B, the middle core 8 of the composite membrane is made of a material similar to that of the sheets 6 and 7 of the preceding embodiment, while the outer sheets 9 and 10 are made of a material similar to that of the core 5 of the embodiment shown in FIG. 2A.

In both cases, good results have been obtained by making the sheets 6, 7, and 8 from a metal or a metal alloy, e.g. aluminum, copper, or steel alloy, having a thickness lying in the range 10 microns to 200 microns, while the sheets 5, 9, and 10 are sheets of elastomer material having a thickness lying in the range 20 microns to 500 microns and having a damping factor ($\tan \delta$) lying in the range $10^{-2}$ to $50.10^{-2}$. The sheets 5, 9, and 10 can thus be selected from sheets based on rubber, on thermoplastic polymer(s) such as polyethylenes, polyvinylchlorides, or polyamides, or sheets made of thermosetting polymer(s) based on epoxy resin(s), phenol resins, or polyurethane, said elastomer or polymer sheets being reinforced, where appropriate, by a woven or non-woven cloth of glass fibers, polyester fibers, cotton fibers, polyaramide fibers such as those known under the name Kevlar (trademark filed by Dupont De Nemours), metal films, or the like.

Figure 3:
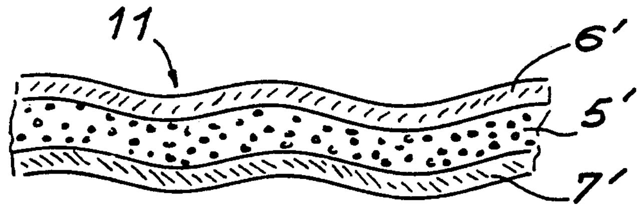
FIG. 3 is a view analogous to FIGS. 2A and 2B for another embodiment.

In the embodiment shown diagrammatically in FIG. 3, the composite membrane is of the type shown in FIG. 2A, i.e. it has a sandwich structure with the middle core 5' being analogous to the core 5 and with outer facings 6' and 7' analogous to the facings 6 and 7. However, in this embodiment the bending stiffness of the membrane is reduced by one or more arrays of corrugations 11, thereby enabling the resonant frequency $f_0$ to be reduced while the other dimensional characteristics (radius R, thickness characteristic moduluses ...) remain fixed.

Given that the resonant frequency $f_0$ also depends on the nature of the fixing 3, the invention also provides for fixing the predetermined value of said resonant frequency by giving the membrane 12 a shape having a periphery with cutouts 13$_1$, 13$_2$, 13$_3$, etc. (FIG. 4), with said membrane being fixed on the substrate by securing the edges 14$_1$, 14$_2$, 14$_3$, etc. of its lobes, with the number, the shape, and the disposition of said lobes being advantageously obtained by calculation, e.g. by application of the method of finite elements.

This same calculation method can be implemented for fixing or adjusting the resonant frequency $f_0$ of the membrane 15 by modifying its mass per unit area, which is done most simply by forming holes 16$_1$, 16$_2$, 16$_3$, ..., (FIG. 5), with the shape, number, and distribution of the holes being established by calculation.

Although the membranes 1, 12, and 15 of the embodiments described above have been described and shown with an outline that is totally or partially substantially circular, the invention is naturally not limited to such examples, and the apparent outline of the membranes may be square, rectangular, elliptical, crescent-shaped, etc. ..., and each membrane may also be partially perforated, corrugated, cutout into lobes, etc.

In the embodiment shown in FIGS. 6A and 6B, the resonators are constituted by vibrating strings 20 tensioned across orifices 4 formed through a substrate 2, each string 20 which is advantageously constituted by twisting together fibers having a high modulus of elasticity being secured at its ends 3 to the edges of the orifice 4.

In one embodiment, the strings are made of metal or metal alloys.

In another embodiment the strings are made of polyester, polyamide, or polyaramide fibers and the strings are impregnated with a material having good damping characteristics, such as a butyl type elastomer, for example.

In the embodiment shown in FIGS. 7A and 7B, the resonators of the protective material and/or of the acoustic conditioning material of the invention are constituted by vibrating blades 21 each secured at one end 22 in the substrate 2, with each blade advantageously being formed in a metal or metal alloy sheet or, in a modification by a composite such as those described above with reference to FIGS. 2 to 5, i.e. by an assembly of metal and/or polymer type materials selected as a function of their characteristics concerning modulus of elasticity, shear modulus, and damping factor.

Figure 14:
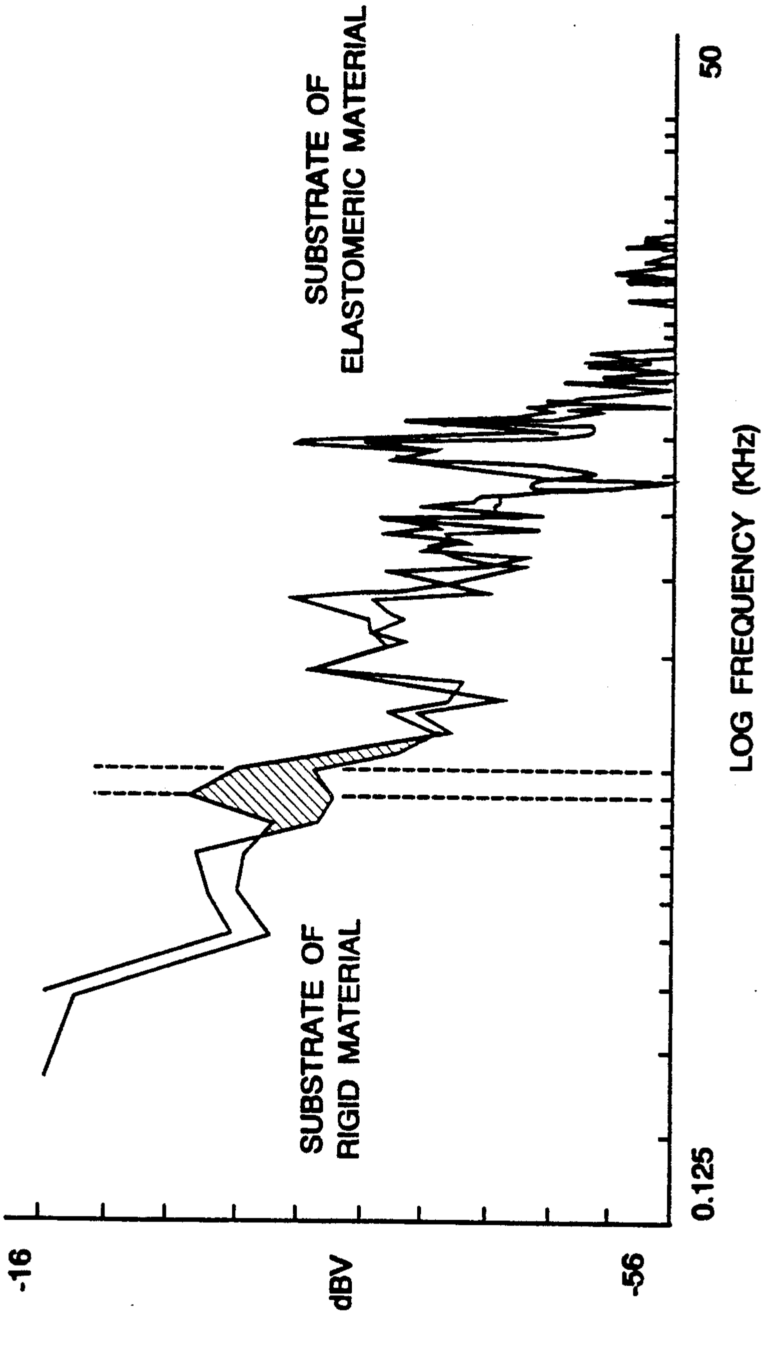
FIGS. 14 and 15 are graphs showing test results.

Regardless of the resonator embodiment used by the material of the invention, the substrate 2 exerts an influence on the resonant frequency of said resonators and on the corresponding energy absorption. This influence is related to the conditions under which the resonators are secured, and thus makes it possible to select a material for the substrate 2 such that it presents damping characteristics that increase the qualities of the material of the invention. A relatively large increase in effectiveness can be obtained, as shown in FIG. 14, when a support plate pierced by circular orifices having a diameter of about 10 mm is provided with metallic membranes, depending on whether the plate is a relatively rigid support or is a support made of elastomer material.

The preferred embodiment of a material according to the invention is thus a support of elastomeric type material with resonators made of metallic membrane, blades or strings.

As shown in FIG. 8, the substrate extends over a surface S and has a multiplicity of orifices 4 pierced therethrough, with each orifice being provided with a vibrating string, blade, or membrane resonator.

Figure 15:
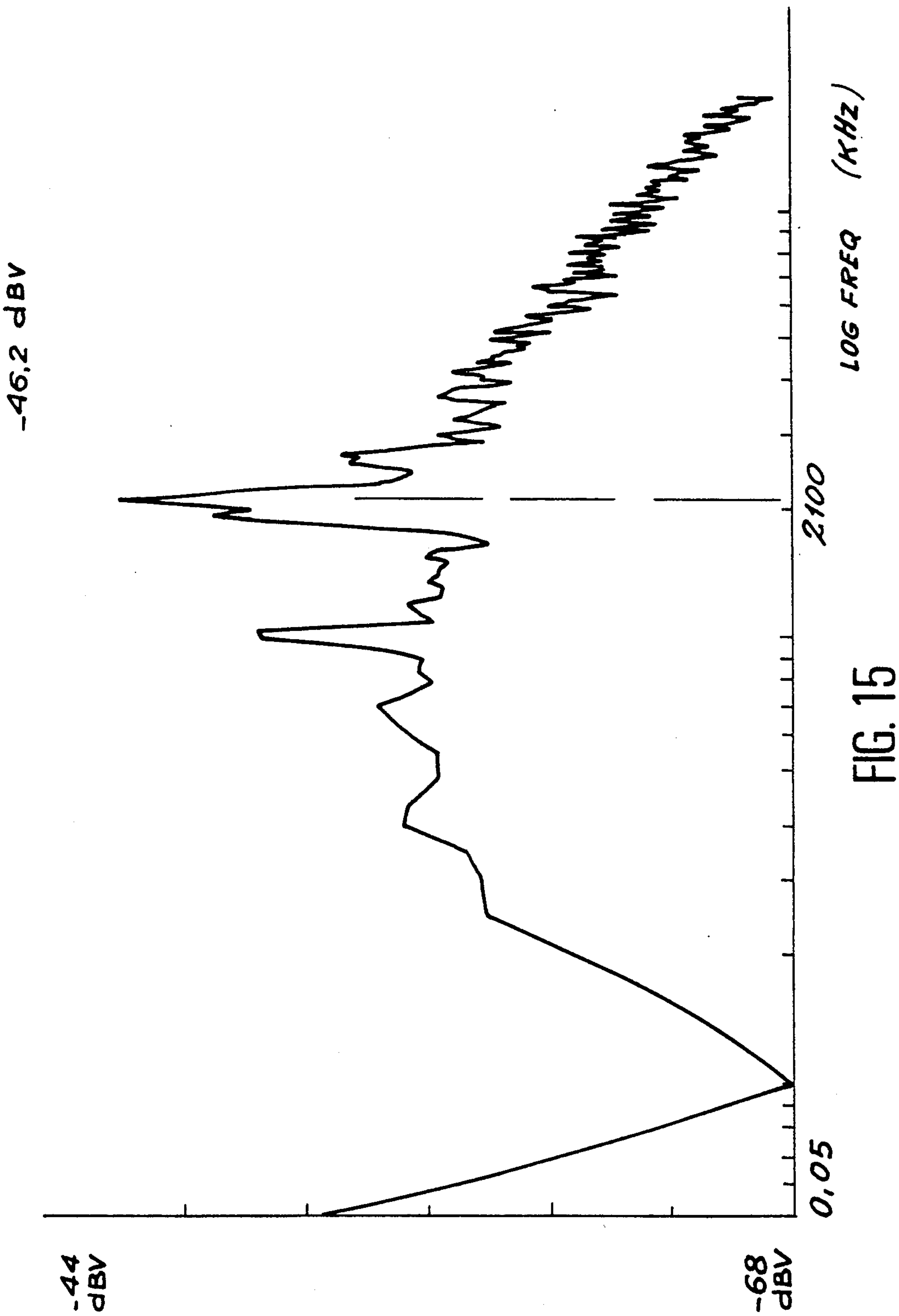

When all of the resonators in the surface S are identical or nearly identical, they present resonant frequencies that are coherent and the absorbed sound pressure energy then corresponds to a well-determined frequency $f_0$, as shown for example in FIG. 15 which shows the response curve to pink noise excitation of a plate having circular holes with a diameter of about 10 mm, as defined above, and having a resonant frequency $f_0$ of about 2100 Hz.

Figure 8A:
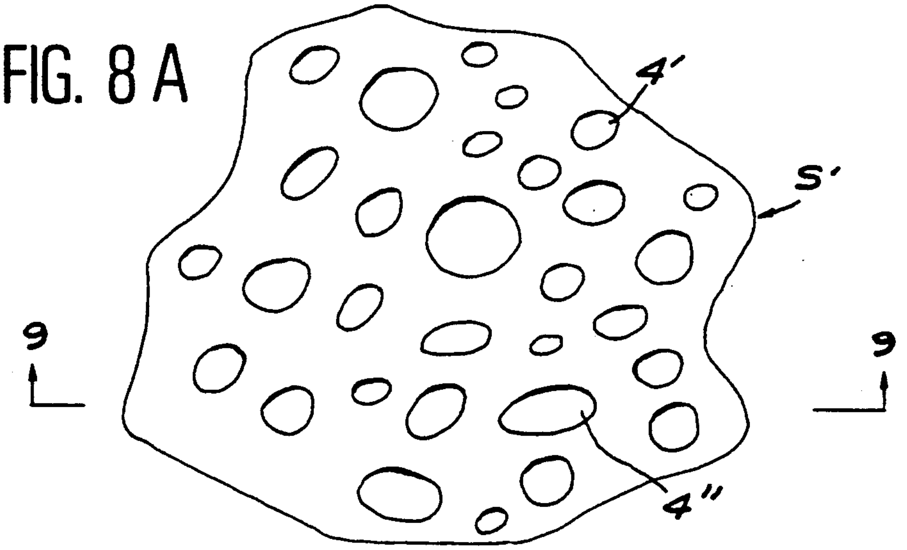
FIG. 8A is a view analogous to FIG. 8 but showing a variant.
Figure 9:
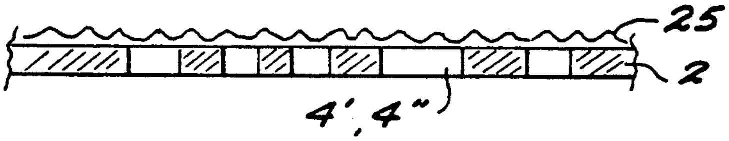
FIG. 9 is a diagrammatic section view on line 9—9 of FIG. 8A.

In contrast, when the surface S' is as shown in FIGS. 8A and 9, i.e. when it is pierced with orifices 4', 4'', etc. of different shapes and sizes, the resonators formed on said surface then resonate at different excitation frequencies $f_1$, $f_2$, $f_3$, etc., thereby absorbing a portion of the sound pressure energy from a noise source in discrete bands corresponding to each of said frequencies.

In such an embodiment, the acoustic protection material of the invention is obtained by fixing a metallic sheet or a sheet 25 of the type described above with reference to FIGS. 2A or 2B onto a substrate 2 pierced with orifices 4', 4'', etc., the sheet being fixed by adhesion or by analogous means such that the regions of the sheet 25 that overlie the orifices 4', 4'', etc. and which are secured by their edges constitute resonators having different resonant frequencies $f_1$, $f_2$, $f_3$, etc. To manufacture surfaces such as S or S', the invention provides to make the substrate 2 from a sheet of elastomer or plastomer having a thickness lying in the range 0.1 mm to 1 mm, e.g. a sheet that is calendered and then perforated to form the orifices 4', 4'', etc., and then to fix said substrate a metallic sheet or foil or else, in a modification, a sheet such as 25 prepared by calendering or by extrusion-blowing its polymer or elastomer component, which component is then coated with a metal foil, or in a variant is made to adhere to such a foil by gluing or the like. To fix the substrate and the metallic or composite sheet together, the invention proposes using hot plate presses or systems using "rotocure" heating cylinders as used in the rubber industry, or else to fix the parts together by cold gluing using structural adhesives such as epoxy resins or the like, or by melting a film of thermoplastic polymer, etc. ... .

Figure 10:
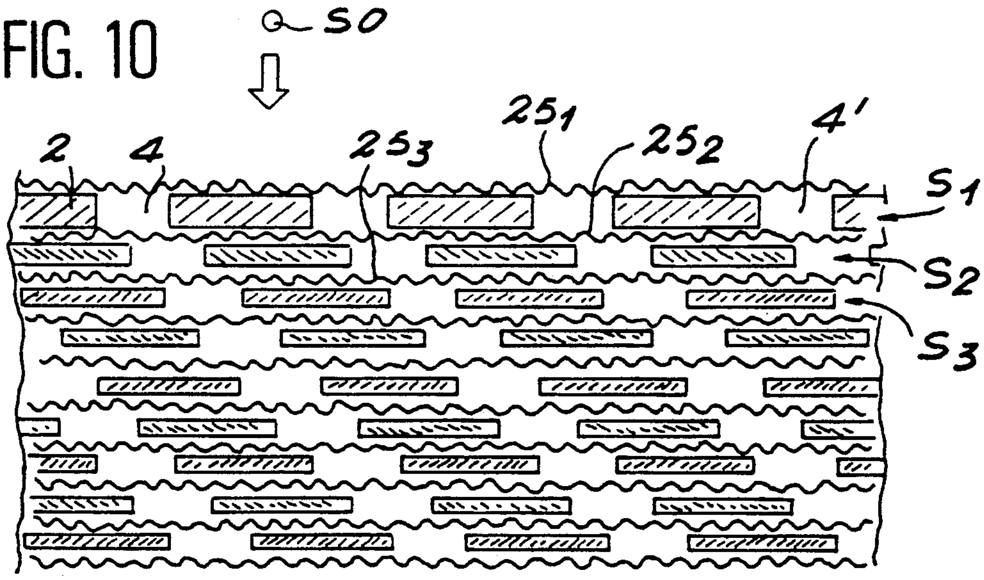
FIG. 10 is a very diagrammatic section view through apparatus of the invention.

To make an apparatus for providing acoustic protection against a source of noise SO (FIG. 10) by means of an acoustic protection material as defined above, the invention provides for superposing and sticking together a multiplexity of layers $S_1$, $S_2$, $S_3$, etc. ..., each of which is of the type shown in FIG. 8 or 8A, i.e. each of which comprises a substrate 2 pierced by orifices 4, 4', 4'', ..., in which or at the edges of which vibrating blade, string, or membrane resonators are secured.

In the embodiment described and shown, the resonators of each layer are constituted by a sheet 25 for the layer $S_1$, $\mathbf{25_2}$ for the layer $S_2$, $\mathbf{25_3}$ for the layer $S_3$, etc. ..., and in order to limit the transmission of sound energy by the effect of continuity between the substrates of the stuck-together layers, the various layers are offset relative to one another so that the resonators of adjacent layers do not face one another. This offset may be the result of calculation, or in a variant it may be obtained by placing the layers $S_1$, $S_2$, $S_3$, etc. randomly relative to one another, thereby supplying apparatus having the capacity to absorb incident sound energy at a multiplicity of frequencies.

Although the above-described embodiments and implementations of the acoustic protection material of the invention dissipate sound pressure energy from the source SO directly in the form of heat, the invention also provides an embodiment in which the acoustic protection material transforms the sound pressure energy into electrical energy, with the electrical energy then being dissipated in the form of heat by the Joule effect.

Figure 11:
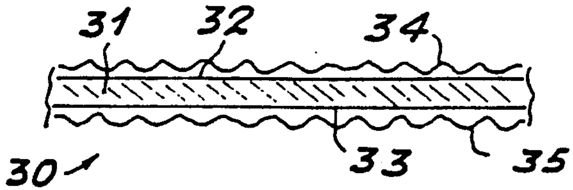
FIG. 11 is a very diagrammatic section view through a different embodiment of material of the invention.

For such a material, a composite element 30 (FIG. 11) is initially made from a sheet 31 of crystalline or polycrystalline type material that generates electric charges on its faces 32 and 33 by the piezoelectric effect in response to the action on said sheet of sound pressure from a noise source. Said sheet 31 is secured to conductive electrodes 34 and 35 which collect said electric charges, which electrodes disposed on respective surfaces 32 and 33 convey said charges and cause them to pass through resistors elements for the purpose of dissipating the electrical energy in the form of heat by the Joule effect. The sheet 31 may be constituted by a PVDF type polymer film which is made semi-crystalline by an appropriate thermomechanical treatment, or by any other material having analogous piezoelectric characteristics, and the electrodes 34 and 35 are advantageously formed by a very fine film of metal or metal alloy obtained by vacuum metallization onto the sheet 31, or, in a variant, glued onto said sheet by means of an adhesive that is intrinsically conductive.

Figure 12:
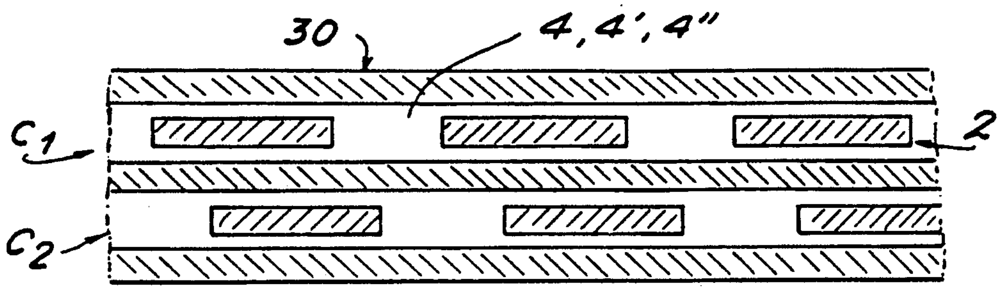
FIGS. 12 and 13 are highly diagrammatic sketches of acoustic protection apparatus made using the material shown in FIG. 11.

To make acoustic protection apparatus using the above-described material, the invention provides for disposing a composite element 30 on a substrate 2 pierced by orifices 4, 4', 4'', ... (FIG. 12), thereby constituting a first layer $C_1$, and then for superposing and gluing together layers $C_1$, $C_2$, etc. ... each formed by a substrate and a composite element 30. In such an embodiment, each substrate 2 is then made conductive to have resistivity that may lie in the range 0.1 ohm.cm to 100 ohm.cm, advantageously by incorporating a conductive filler such as carbon black or a metal powder in an insulating matrix so as to confer a resistive effect on each of the layers C, thereby ensuring that the electrical energy is dissipated by the Joule effect.

Figure 13:
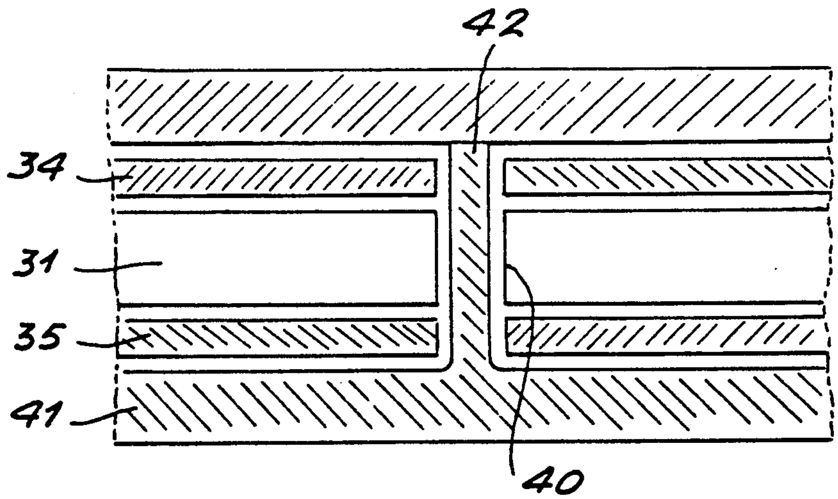

Also in this embodiment, the invention provides for ensuring electrical continuity between the electrodes 34 and 35 applied on the two opposite faces of the sheet 31 by forming microperforations 40 through said sheet (FIG. 13), such that a conductive polymer material 41 provided for assembling together the layers C also ensures electrical continuity between the electrodes 34 and 35 via small bridges 42 formed through the microperforations 40.

Apparatuses such as those described above have a very large number of applications both in the home and in industry.

Thus, and without these suggestions being limiting in any way, they may be used for attenuating noise in the cab of a vehicle by being interposed in the form of a plate between said cab and a source of noise such as an engine, a transmission, or an aerodynamic flow.

They may also be used for attenuating noise in aircraft (by fixing plates on the inside walls of the cockpit) or else in land vehicles, road vehicles or rail vehicles, and also in river- or sea-going vehicles, being used as covers for sources of noise such as engines, exhausts, etc.

Such plates may also be used for covering noisy machines, for lining the walls of enclosures in factories or noisy workshops, and in general in any building for dwelling or for industrial purposes in which apparatus of the invention is suitable for use not only for reducing noise coming from adjacent premises, but also for protecting buildings against noise from outside, with this function being particularly advantageous for providing protection against roads or motorways, particularly in an urban setting.

The materials and apparatuses of the invention are also advantageously applicable to providing acoustic correction and/or conditioning for premises where they are used by being fixed on the walls of said premises to absorb soundwaves that are reflected on the plates of the apparatus, thereby reducing noise levels and increasing user comfort.

We claim:

1. Material for providing acoustic protection against a source of noise whose spectrum includes frequency components that are harmonically unrelated, the material comprising a flexible substrate having a surface, and a plurality of resonators formed on and extending substantially along said substrate surface, wherein each of said resonators has a characteristic predetermined resonant frequency, at which resonant frequency sound pressure from said noise source is absorbed and dissipated as energy, wherein said material attenuates harmonically related and harmonically unrelated frequency components present in said noise source.

2. Material according to claim 1, wherein said substrate defines a plurality of orifices having edges, at least some of said resonators being secured to said edges.

3. A material according to claim 1, wherein at least one said resonator includes a metallic membrane, and wherein said substrate includes an elastomeric material.

4. A material according to claim 1, wherein at least one said resonator is a composite membrane including at least two sheets of material having a high modulus of elasticity and a low damping factor, and a sheet of material having a low shear modulus and a high damping factor.

5. A material according to claim 4, wherein said composite membrane includes first and second sheets of a material having a high modulus of elasticity and a low damping factor, disposed on either side of a third sheet of material having a low shear modulus and a high damping factor.

6. A material according to claim 5, wherein said first and second sheets of material have a thickness in the range 10 microns to 200 microns and are selected from the group consisting of a metal and a metal alloy, and wherein said third sheet of material includes elastomer material having a thickness in the range 20 microns to 500 microns, and having a damping factor in the range 0.01 to 0.50.

7. A material according to claim 4, wherein said composite membrane includes first and second sheets of an elastomer material having low shear modulus and a high damping factor, disposed on either side of a third sheet of material having a high modulus of elasticity and a low damping factor selected from the group consisting of metal and a metal alloy.

8. A material according to claim 1, wherein at least one said resonator includes a membrane defining an outline shape selected from the group consisting of a circle, an ellipse, a crescent, a square, and a lobe.

9. A material according to claim 8, wherein each said membrane includes a lobe having end edges, and is secured to said substrate by said end edges.

10. A material according to claim 8, wherein said membrane includes corrugations and wherein said resonant frequency is determined by forming at least one array of said corrugations.

11. A material according to claim 8, wherein said membrane surface defines openings and wherein said resonant frequency is determined by a characteristic of said openings selected from the group consisting of opening shape and size.

12. A material according to claim 1, wherein said resonators include thread-like elements having a high modulus of elasticity, which elements are twisted together.

13. An acoustic protection material according to claim 1, wherein said resonators include vibrating blades having one blade end secured to said substrate, said blades having a high modulus of elasticity and include a material selected from the group consisting of metal and a polymer.

14. An acoustic protection material according to claim 1, wherein said resonators include composite vibrating blades having a high modulus of elasticity and include a material selected from the group consisting of metal, a polymer, and a material having a high damping factor.

15. Material according to claim 1, wherein said predetermined resonant frequency is determined by at least one characteristic of each said resonator selected from the group consisting of resonator density, resonator modulus of elasticity, resonator shear modulus, resonator damping factor, resonator piezoelectric characteristic, resonator size and resonator shape.

16. Material according to claim 1, wherein said energy is dissipated in an energy form selected from the group consisting of mechanical heat, and electrical energy.

17. Material according to claim 2, wherein at least one of said resonators has a form selected from the group consisting of a vibrating membrane, a vibrating blade, and a vibrating string.

18. Material for providing acoustic protection against a source of noise, the material comprising:

- a substrate including an elastomeric material and having a surface; and
- a plurality of resonators formed on and extending substantially along said substrate surface, at least one of said plurality of resonators being a composite membrane having at least one characteristic selected from the group consisting of:

(a) a said composite membrane including at least two sheets of material having a high modulus of elasticity and a low damping factor, and a sheet of material having a low shear modulus and a high damping factor;

(b) a said composite membrane including first and second sheets of a material having a high modulus of elasticity and a low damping factor, disposed on either side of a third sheet of material having a low shear modulus and a high damping factor;

(c) a said composite membrane including first and second sheets of a material including a metal and having a high modulus of elasticity, a low damping factor, and a thickness in the range of 10 microns to 200 microns, said first and second sheets disposed on either side of a third sheet of material including an elastomer and having a low shear modulus, a damping factor in the range 0.01 to 0.50, and having a thickness in the range 20 microns to 500 microns; and (d) a said composite membrane including first and second sheets of an elastomer material having low shear modulus and a high damping factor, disposed on either side of a third sheet of material including a metal having a high modulus of elasticity and a low damping factor;

wherein each of said resonators has a characteristic predetermined resonant frequency at which resonant frequency sound pressure from said noise source is absorbed and dissipated as energy.

19. Material for providing acoustic protection against a source of noise, the material comprising:

a substrate having a surface; and a plurality of resonators, at least one of which resonators includes a membrane defining an outline shape selected from the group consisting of a circle, an ellipse, a crescent, a square, and a lobe, said resonators being formed on and extending substantially along said substrate surface;

wherein each of said resonators has a characteristic predetermined resonant frequency at which resonant frequency sound pressure from said noise source is absorbed and dissipated as energy.

20. A material according to claim 14, wherein said membrane includes at least one characteristic selected from the group consisting of:

(a) a said membrane including a lobe having end edges, wherein said membrane is secured to said substrate by said end edges;

(b) a said membrane including corrugations, wherein said resonant frequency is determined by forming at least one array of said corrugations; and (c) a said membrane having a surface defining openings, wherein said resonant frequency is determined by a characteristic of said openings selected from the group consisting of opening shape and size.

* * * * *